United States Patent
Khayat

(10) Patent No.: US 9,369,042 B1
(45) Date of Patent: Jun. 14, 2016

(54) MULTIPHASE DC-TO-DC SWITCHING POWER CONVERTER WITH LEADING EDGE AND CROSS CHANNEL BLANKING

(71) Applicant: Texas Instruments Incorporated, Dallas, TX (US)

(72) Inventor: Joseph Maurice Khayat, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 21 days.

(21) Appl. No.: 14/581,681

(22) Filed: Dec. 23, 2014

(51) Int. Cl.
  *G05F 1/00* (2006.01)
  *H02M 3/158* (2006.01)
(52) U.S. Cl.
  CPC .................................... *H02M 3/158* (2013.01)
(58) Field of Classification Search
  CPC ....................................................... H02M 3/158
  See application file for complete search history.

(56) References Cited

U.S. PATENT DOCUMENTS

| | | | | |
|---|---|---|---|---|
| 2006/0239046 A1* | 10/2006 | Zane | ................... | H02M 3/1584 363/65 |
| 2006/0250119 A1* | 11/2006 | Ostrom | ................... | G05F 1/613 313/266 |
| 2007/0200538 A1* | 8/2007 | Tang | ..................... | H02M 3/158 323/237 |
| 2009/0146621 A1* | 6/2009 | Tang | ................... | H02M 3/1584 323/234 |

* cited by examiner

*Primary Examiner* — Jue Zhang
(74) *Attorney, Agent, or Firm* — John R. Pessetto; Frank D. Cimino

(57) ABSTRACT

A multiphase DC-to-DC synchronous power converter, which has a number of converter channels that generate a corresponding number of current sense signals, blanks the current sense signals in a first converter channel for periods of time that correspond with the actions of the transistors in a second converter channel, where the actions result in noise spikes across the converter that falsely interfere with current sensing in the first converter channel.

20 Claims, 2 Drawing Sheets

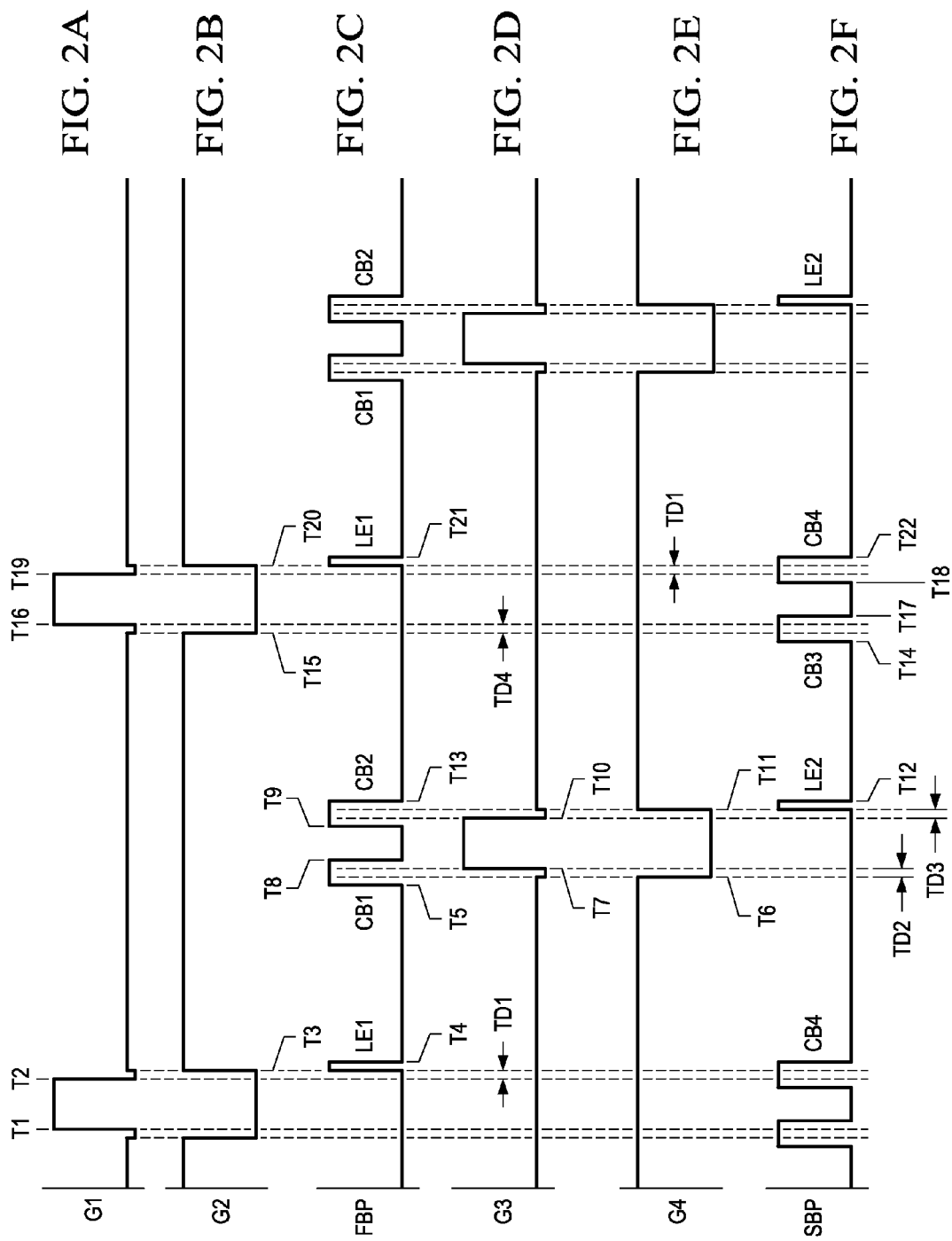

MULTIPHASE DC-TO-DC SWITCHING POWER CONVERTER WITH LEADING EDGE AND CROSS CHANNEL BLANKING

BACKGROUND OF THE INVENTION

1. Field of the Invention

The present invention relates to multiphase DC-to-DC switching power converters and, more particularly, to a multiphase DC-to-DC switching power converter with leading edge and cross channel blanking.

2. Description of the Related Art

A DC-to-DC switching power converter is a device that converts one DC voltage to another DC voltage with very little power loss. A buck converter is one type of DC-to-DC switching power converter that receives an input voltage of one polarity, and generates an output voltage of the same polarity that is lower than the input voltage.

A buck converter utilizes a pulse width modulated (PWM) signal to turn a power MOS transistor on and off. When the power MOS transistor is turned on, a current flows from the power MOS transistor through an inductor to a capacitor and a load. When the power MOS transistor is turned off, a current flows from ground through a diode and the inductor to the capacitor and the load.

The output voltage across the capacitor has a value approximately equal to the duty cycle of the PWM signal multiplied times the input voltage. For example, a PWM signal with a 10% duty cycle input to a buck converter with a 12V input voltage produces an output voltage of approximately 1.2V.

A synchronous buck converter is a buck converter where the diode has been replaced with another MOS transistor, which is also referred to as a synchronous MOS rectifier. The combination of the power MOS transistor and the synchronous MOS rectifier is often referred to as a half bridge. A multiphase synchronous buck converter is a multichannel buck converter that includes two or more substantially-identical synchronous buck converter circuits that are driven out of phase.

For example, a two-phase synchronous buck converter is a two-channel buck converter that includes two identical synchronous buck converter circuits that share a common capacitor, with power MOS transistors that are driven 180° out of phase. A multiphase, multi-output synchronous buck converter utilizes different buck converter channels from the same or different input supply voltages. This can be integrated on the same silicon substrate, and is often driven out of phase from one another.

Buck converters often use current sense circuits to measure the magnitude of the current that flows through either the power MOS transistor or the synchronous MOS transistor. The current measurement can be used for a variety of purposes. For example, with peak current control, the current measurement can be used directly or indirectly to control the timing of the falling edge of a PWM signal, which turns off the power MOS transistor.

One problem with sensing the current that flows through a power MOS transistor or a synchronous MOS transistor is that as the MOS transistor turns on, circuit parasitics (both substrate level and board level, such as package lead inductance), high current gate drive pulses, and other factors can create a significant noise spike on the leading edge of a current sense signal that represents the current that flows through the MOS transistor. This noise can cause faulty current measurements which, in turn, can lead to improper circuit operation.

One approach to overcoming this problem is known as leading-edge blanking. With leading-edge blanking, the current sense signal is blanked (e.g., held to ground) for a specific amount of time while the MOS transistor is initially turned on. The specific amount of time corresponds with the width of the noise spike on the leading edge of the current sense signal.

SUMMARY OF THE INVENTION

The present invention is a power converter that removes the effects of noise spikes, particularly in a multiphase converter. The power converter includes a first MOS transistor, a second MOS transistor that is connected to the first MOS transistor, a third MOS transistor, and a fourth MOS transistor that is connected to the third MOS transistor. The power converter also includes a first current sense circuit that is connected to the second MOS transistor. The first current sense circuit senses a current that flows through the second MOS transistor, and outputs a first current sense signal in response. The power converter further includes a first blanking circuit that is connected to the first current sense circuit. The first blanking circuit blanks the first current sense signal for a first cross blanking period of time in response to a first cross blanking pulse of a plurality of first blanking pulses. The first cross blanking period of time begins before the fourth MOS transistor turns off and ends after the third MOS transistor turns on. The power converter additionally includes a controller that is connected to the first, second, third, and fourth MOS transistors and the first blanking circuit. The controller outputs the plurality of first blanking pulses.

The power converter alternately includes a plurality of channels. Each channel has a first MOS transistor, a second MOS transistor that is connected to the first MOS transistor, and an inductor that is connected to the first and second MOS transistors. Each channel also includes a current sense circuit that is connected to the second MOS transistor, and a blanking circuit that is connected to the current sense circuit. The current sense circuit senses a current that flows through the second MOS transistor, and outputs a current sense signal in response. The blanking circuit receives the current sense signal. The alternate power converter also includes a controller that is connected to each channel. The controller selects a channel from the plurality of channels as a selected channel, and outputs: a gate signal to the second MOS transistor in the selected channel to turn off the second MOS transistor in the selected channel; a gate signal to the first MOS transistor in the selected channel to turn on the first MOS transistor in the selected channel; and a first cross blanking pulse to the blanking circuit in each non-selected channel of the plurality of channels. Each blanking circuit in a non-selected channel to blank the current sense signal in the non-selected channel in response to the first cross blanking pulse for a first cross blanking period of time that begins before the second MOS transistor in the selected channel turns off and ends after the first MOS transistor in the selected channel turns on.

The present invention also includes a method of operating a power converter. The method includes turning off a first MOS transistor, and turning on a second MOS transistor. The second MOS transistor is connected to the first MOS transistor. The method also includes sensing a current that flows through the second MOS transistor when the second MOS transistor is turned on, and outputting a first current sense signal in response. The method further includes turning on a third MOS transistor after a fourth MOS transistor has turned off. The fourth MOS transistor is connected to the third MOS transistor. The method additionally includes blanking the first current sense signal for a first cross blanking period of time.

The first cross blanking period of time begins before the fourth MOS transistor turns off and ends after the third MOS transistor turns on.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 2A-2F are timing diagrams illustrating an example of the operation of a two-phase synchronous buck converter 100 in accordance with the present invention.

DETAILED DESCRIPTION OF THE INVENTION

Figure 1:
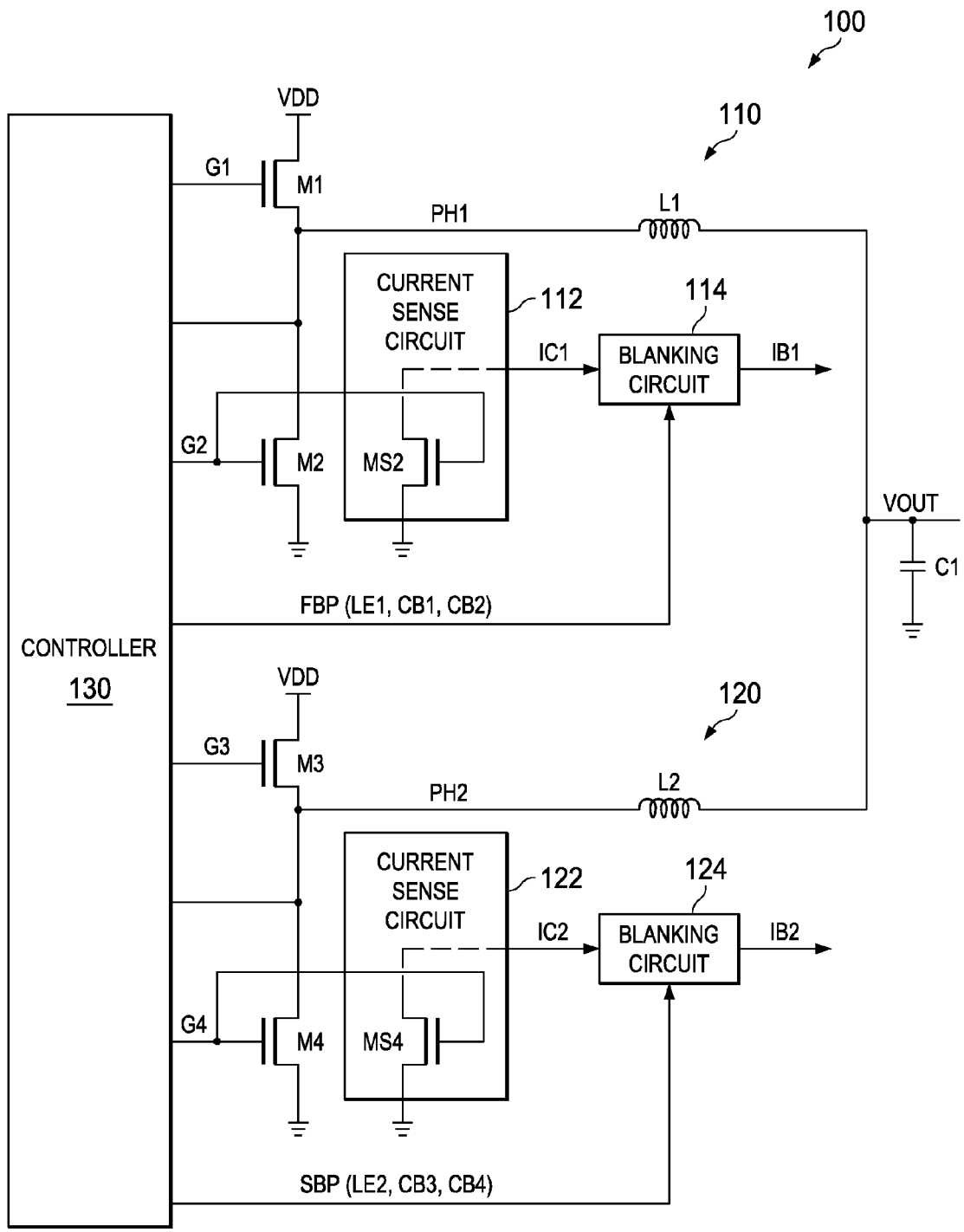
FIG. 1 is a block-schematic diagram illustrating an example of a two-phase synchronous buck converter 100 in accordance with the present invention.

FIG. 1 shows a block-schematic diagram that illustrates an example of a two-phase synchronous buck converter 100 in accordance with the present invention. Buck converter 100 is an example of a multiphase switching power converter with current sense circuitry that utilizes leading-edge and cross channel blanking to eliminate noise spikes on the current sense signals output by the current sense circuitry.

As shown in FIG. 1, buck converter 100 has a first channel 110 with a first buck converter circuit that includes a power MOS transistor M1, a power MOS transistor M2, and an inductor L1. MOS transistor M1 has a gate, a drain connected to a voltage source VDD, and a source connected to inductor L1. MOS transistor M2 has a gate, a drain connected to inductor L1 and the source of MOS transistor M1, and a source connected to ground. Inductor L1 has an inductor voltage PH1 on the source of MOS transistor M1 and the drain of MOS transistor M2.

Channel 110 also includes a current sense circuit 112 that is connected to MOS transistor M2, and a blanking circuit 114 that is connected to current sense circuit 112. Current sense circuit 112 senses a current that flows through MOS transistor M2, and outputs a current sense signal IC1 in response that represents the sensed current.

Current sense circuit 112 can be implemented in any conventional manner. In the present example, current sense circuit 112 includes a sense MOS transistor MS2 that has a gate connected to the gate of power MOS transistor M2, a drain that outputs the current sense signal IC1, and a source connected to ground.

In operation, the voltage across sense MOS transistor MS2 is substantially equal to the voltage across power MOS transistor M2. When power MOS transistor M2 and sense MOS transistor MS2 are turned on, the currents through the MOS transistors M2 and MS2 are primarily set by the ratio of the areas of the MOS transistors M2 and MS2. Common ratios run from 1,000:1 to 10,000:1, or that the power MOS transistor is 1,000× to 10,000× bigger than the sense MOS transistor. Thus, sense MOS transistor MS2 passes only a small fraction of the total current.

Blanking circuit 114 receives a number of first blanking pulses FBP, which include a leading-edge blanking pulse LE1, a cross blanking pulse CB1, and a cross blanking pulse CB2. Blanking circuit 114 blanks the current sense signal IC1 for an IC1 edge blanking period of time in response to the leading-edge blanking pulse LE1, blanks the current sense signal IC1 for a first IC1 cross blanking period of time in response to the cross blanking pulse CB1, and blanks the current sense signal IC1 for a second IC1 cross blanking period of time in response to the cross blanking pulse CB2.

Blanking circuit 114 outputs a blanked sense signal IB1 which is identical to the current sense signal IC1, except that the blanked sense signal IB1 is held at a low voltage level, such as ground, during the IC1 edge and cross blanking periods of time. In the present example, the first IC1 cross blanking period of time and the second IC1 cross blanking period of time are substantially equal. In addition, the IC1 edge blanking period of time is less than (but can optionally be equal to) the first and second IC1 cross blanking periods of time. Blanking circuit 114 can be implemented in any conventional fashion.

As further shown in FIG. 1, buck converter 100 includes a second channel 120 with a second buck converter circuit that includes a power MOS transistor M3, a power MOS transistor M4, and an inductor L2. MOS transistor M3 has a gate, a drain connected to the voltage source VDD, and a source connected to inductor L2. MOS transistor M4 has a gate, a drain connected to MOS transistor M3 and inductor L2, and a source connected to ground. Inductor L2 has an inductor voltage PH2 on the source of MOS transistor M3 and the drain of MOS transistor M4.

Channel 120 also includes a current sense circuit 122 that is connected to MOS transistor M4, and a blanking circuit 124 that is connected to current sense circuit 122. Current sense circuit 122 senses a current that flows through MOS transistor M4, and outputs a current sense signal IC2 in response that represents the sensed current.

Current sense circuit 122 can be implemented in any conventional manner. In the present example, current sense circuit 122 includes a sense MOS transistor MS4 that has a gate connected to the gate of power MOS transistor M4, a drain that outputs the current sense signal IC2, and a source connected to ground.

In operation, the voltage across sense MOS transistor MS4 is substantially equal to the voltage across power MOS transistor M4. When power MOS transistor M4 and sense MOS transistor MS4 are turned on, the currents through the MOS transistors M4 and MS4 are primarily set by the ratio of the areas of the MOS transistors M4 and MS4. Thus, sense MOS transistor MS4 passes only a small fraction of the total current.

Blanking circuit 124 receives a number of second blanking pulses SBP, which include a leading-edge blanking pulse LE2, a cross blanking pulse CB3, and a cross blanking pulse CB4. Blanking circuit 124 blanks the current sense signal IC2 for an IC2 edge blanking period of time in response to the leading-edge blanking pulse LE2, blanks the current sense signal IC2 for a first IC2 cross blanking period of time in response to the cross blanking pulse CB3, and blanks the current sense signal IC2 for a second IC2 cross blanking period of time in response to the cross blanking pulse CB4.

Blanking circuit 124 outputs a blanked sense signal IB2 which is identical to the current sense signal IC2, except that the blanked sense signal IB2 is held at a low voltage level, such as ground, during the during the IC2 edge and cross blanking periods of time. In the present example, the first IC2 cross blanking period of time and the second IC2 cross blanking period of time are substantially equal. The IC2 edge blanking period of time is less than (but can optionally be equal to) the first and second IC2 cross blanking periods of time. Blanking circuit 124 can be implemented in any conventional fashion.

As additionally shown in FIG. 1, buck converter 100 includes a shared capacitor C1 and a controller 130. Capacitor C1 is connected to the inductors L1 and L2, and an output node VOUT. Controller 130 is connected to the power MOS transistors M1, M2, M3, and M4, the sense MOS transistors MS2 and MS4, and the blanking circuits 114 and 124.

Controller 130 generates and outputs a first gate signal G1 to MOS transistor M1 that turns MOS transistor M1 on and off. In addition, controller 130 generates and outputs a second gate signal G2 to MOS transistor M2 and MOS transistor MS2 that turns the MOS transistors M2 and MS2 on and off at the same time.

Controller 130 also generates and outputs a third signal G3 to MOS transistor M3 that turns MOS transistor M3 on and off. Further, controller 130 generates and outputs a fourth gate signal G4 to MOS transistor M4 and MOS transistor MS4 that turns the MOS transistors M4 and MS4 on and off at the same time.

In the present example, the first and third gate signals G1 and G3 are pulsed waves that have identical periods and widths, but rising edges that are substantially 180° out of phase. Further, the second and fourth gate signals G2 and G4 are pulsed waves that have identical periods and widths, but rising edges that are substantially 180° out of phase.

In addition, except for short dead times which prevent the MOS transistors M1 and M2 from being turned on at the same time, the second gate signal G2 is low when the first gate signal G1 is high, and the second gate signal G2 is high when the first gate signal G1 is low. Similarly, except for short dead times which prevent the MOS transistors M3 and M4 from being turned on at the same time, the fourth gate signal G4 is low when the third gate signal G3 is high, and the fourth gate signal G4 is high when the third gate signal G3 is low.

Further, controller 130 generates and outputs the first blanking pulses FBP and the second blanking pulses SBP. Controller 130 can generate and output the first blanking pulses FBP to blanking circuit 114 as serial or parallel signals. Controller 130 can also generate and output the second blanking pulses SBP to blanking circuit 124 as serial or parallel signals. Controller 130 can be implemented in a conventional fashion, such as in logic.

In the present example, controller 130 generates and outputs the cross blanking pulse CB1 with a rising edge that occurs just before the falling edge of the gate signal G4, and a falling edge that occurs just after the rising edge of the gate signal G3. Thus, the first IC1 cross blanking period of time, which is defined by the rising and falling edges of the cross blanking pulse CB1, blanks the current sense signal IC1 during the very noisy time that MOS transistor M3 turns on as well as the less noisy time that MOS transistor M4 turns off. MOS transistor M3 turning on causes inductor voltage PH2 to rise substantially fast, which causes noise injection into the system due to the parasitics on inductor voltage PH2, whereby such noise couples to current sense circuit 112.

Controller 130 also generates and outputs the cross blanking pulse CB2 with a rising edge that occurs just before the falling edge of the gate signal G3, and a falling edge that occurs just after the rising edge of the gate signal G4. Thus, the second IC1 cross blanking period of time, which is defined by the rising and falling edges of the cross blanking pulse CB2, blanks the current sense signal IC1 during the noisy time that MOS transistor M3 turns off as well as the less noisy time that MOS transistor M4 turns on. MOS transistor M3 turning off causes inductor voltage PH2 to fall substantially fast, which causes noise injection into the system due to the parasitics on inductor voltage PH2, whereby such noise couples to current sense circuit 112.

In addition, controller 130 generates and outputs the cross blanking pulse CB3 with a rising edge that occurs just before the falling edge of the gate signal G2, and a falling edge that occurs just after the rising edge of the gate signal G1. Thus, the first IC2 cross blanking period of time, which is defined by the rising and falling edges of the cross blanking pulse CB3, blanks the current sense signal IC2 during the very noisy time that MOS transistor M1 turns on as well as the less noisy time that MOS transistor M2 turns off. MOS transistor M1 turning on causes inductor voltage PH1 to rise substantially fast, which causes noise injection into the system due to the parasitics on inductor voltage PH1, whereby such noise couples to current sense circuit 122.

Further, controller 130 generates and outputs the cross blanking pulse CB4 with a rising edge that occurs just before the falling edge of the gate signal G1, and a falling edge that occurs just after the rising edge of the gate signal G2. Thus, the second IC2 cross blanking period of time, which is defined by the rising and falling edges of the cross blanking pulse CB4, blanks the current sense signal IC2 during the noisy time that MOS transistor M1 turns off as well as the less noisy time that MOS transistor M2 turns on. MOS transistor M1 turning off causes inductor voltage PH1 to fall substantially fast, which causes noise injection into the system due to the parasitics on inductor voltage PH1, whereby such noise couples to current sense circuit 122.

In addition, controller 130 generates and outputs the rising edge of leading-edge blanking pulse LE1 on the rising edge of the gate signal G2 and, after the IC1 edge blanking period of time, generates and outputs the falling edge of leading-edge blanking pulse LE1. Controller 130 also generates and outputs the rising edge of leading-edge blanking pulse LE2 on the rising edge of the gate signal G4 and, after the IC2 edge blanking period of time, generates and outputs the falling edge of leading-edge blanking pulse LE2.

In operation, MOS transistor M1 in first channel 110 is turned on and off to source current to capacitor C1 through inductor L1, while MOS transistor M3 in second channel 120 is turned on and off to source current to capacitor C1 through inductor L2. However, when buck converter 100 is implemented in an integrated circuit, significant noise perturbances occur in second channel 120 when MOS transistor M1 turns on or off, resulting in inductor voltage PH1 rising or falling, and significant noise perturbances occur in first channel 110 when MOS transistor M3 turns on or off, resulting in inductor voltage PH2 rising or falling.

The noise perturbances result from the speed and magnitude of the voltages that change. Circuits within controller 130 drive the gate signals G1 and G3 180° out of phase with edges that are fast rising with significant slew rates. The MOS transistors M1 and M3 turn on quickly in response to the fast rising gate signals G1 and G3 which, in turn, cause the inductor voltages PH1 and PH2 on the sources of the MOS transistors M1 and M3, respectively, to follow and quickly rise.

The internal parasitics tend to couple across the integrated circuit and cause current sense circuit 122 to falsely trip when MOS transistor M1 turns on, and cause current sense circuit 112 to falsely trip when MOS transistor M3 turns on. Similarly is the case when the MOS transistors M1 and M3 are turned off. Thus, the action of MOS transistor M1, which lies in first channel 110, adversely affects the sensitivity of current sense circuit 122, which lies in second (cross) channel 120. Similarly, the action of MOS transistor M3, which lies in second channel 120, adversely affects the sensitivity of current sense circuit 112, which lies in first (cross) channel 110.

In the present invention, the current sense signal in a channel is protected from noise perturbances that occur in the other cross channels by blanking the current sense signal during the times that the MOS transistors in the other cross channels are switched. For example, the current sense signal IC1 in buck converter channel 110 is protected from noise perturbances that occur in buck converter channel 120 by blanking the current sense signal IC1 during the times that MOS transistor M3 turns on. Similarly, the current sense signal IC2 in buck converter channel 120 is protected from noise perturbances that occur in buck converter channel 110 by blanking the current sense signal IC2 during the times that MOS transistor M1 turns on.

Thus, buck converter 100, which includes multiple switching half bridges, blanks out the noise that results from a switching event on one half bridge, for example, from falsely triggering a sensitive measurement, such as current sense, that takes place on a different half bridge. As a result, the effects of noise spikes from multiple switching events are appropriately managed throughout accurate sensing measurements.

FIGS. 2A-2F are timing diagrams that illustrate an example of the operation of buck converter 100 in accordance with the present invention. As shown in FIGS. 2A-2F, and with reference to FIG. 1, the description of the operation of buck converter 100 begins at time T1 with controller 130 outputting the rising edge of the gate signal G1, which turns on MOS transistor M1.

When MOS transistor M1 turns on, a current flows through MOS transistor M1 and inductor L1 to capacitor C1. The current that flows through inductor L1 creates and temporarily stores energy in a magnetic field around inductor L1, while the current that flows to capacitor C1 charges up the voltage on capacitor C1.

At time T2, the gate signal G1 falls and turns off MOS transistor M1. At time T3, controller 130 outputs the rising edge of the gate signal G2, which turns on MOS transistor M2. The difference in time between time T2 and time T3 is a short dead time TD1, which is less than the G1 pulse width (T2–T1) and on the order of a few nanoseconds. The dead time TD1 ensures that MOS transistor M1 is fully off before MOS transistor M2 turns on, which prevents shoot-through from occurring where current flows through MOS transistor M1 and MOS transistor M2 directly to ground.

When MOS transistor M1 turns off, a current no longer flows through MOS transistor M1 to inductor L1. However, a current continues to flow through inductor L1, circulating from ground and the body-to-drain diode of MOS transistor M2, because the current in an inductor cannot change instantaneously. After MOS transistor M2 turns on, a current flows from the ground-connected source to the drain of MOS transistor M2 through inductor L1 to capacitor C1.

Current sense circuit 112 senses the magnitude of the current that flows through MOS transistor M2. Due to circuit parasitics (both substrate level and board level, such as package lead inductances), high current gate drive pulses, and other factors, a noise spike can be generated on the leading edge of the current sense signal IC1 when MOS transistor M2 turns on.

In addition to the gate signal G2, controller 130 also outputs the rising edge of the leading-edge blanking pulse LE1 at time T3. Blanking circuit 114 receives the current sense signal IC1 and the leading-edge blanking pulse LE1, blanks the current sense signal IC1 for the IC1 edge blanking period of time in response to the rising edge of the leading-edge blanking pulse LE1, and outputs the blanked sense signal IB1 in response.

At time T4, the leading-edge blanking pulse LE1 falls. In the present example, blanking circuit 114 uses the rising and falling edges of the leading-edge blanking signal LE1 to define the IC1 edge blanking period of time. The blanked sense signal IB1 is identical to the current sense signal IC1 when MOS transistor M2 is on, except that the blanked sense signal IB1 is held at a low voltage level, such as ground, during the blanking periods of time, such as the IC1 edge blanking period of time.

The duration of the IC1 edge blanking period of time corresponds with the width of the noise spike on the leading edge of the current sense signal IC1. Thus, by holding the current sense signal IC1 at a low voltage level during the IC1 edge blanking period of time, the effects of any noise spike on the leading edge of the current sense signal IC1 are removed.

At time T5, controller 130 outputs the rising edge of the first IC1 cross blanking pulse CB1. At time T6, the gate signal G4 falls and turns off MOS transistor M4. At time T7, controller 130 outputs the rising edge of the gate signal G3, which turns on MOS transistor M3. The difference in time between time T6 and time T7 is a dead time TD2, which is less than the G3 pulse width (T10–T7) and on the order of a few nanoseconds. The dead time TD2 ensures that MOS transistor M4 is fully off before MOS transistor M3 turns on, which prevents shoot-through from occurring where current flows through MOS transistor M3 and MOS transistor M4 directly to ground.

When MOS transistor M3 turns on, a current flows through MOS transistor M3 and inductor L2 to capacitor C1 to charge up the voltage on capacitor C1. At time T8, controller 130 outputs the falling edge of the IC1 cross blanking pulse CB1. The rising and falling edges of the IC1 cross blanking pulse CB1 define the first IC1 cross blanking period of time.

Due to the coupling of circuit parasitics within an integrated circuit, a noise spike can be generated on the current sense signal IC1 when MOS transistor M4 turns off, and a significant noise spike can be generated on the current sense signal IC1 when MOS transistor M3 turns on. The duration of the first IC1 cross blanking period of time corresponds with the width of the noise spikes on the current sense signal IC1 that can result from MOS transistor M4 turning off and MOS transistor M3 turning on. Thus, by holding the current sense signal IC1 at a low voltage level during the first IC1 cross blanking period of time, the effects of any cross-coupled noise spike on the current sense signal IC1 that result from MOS transistor M4 turning off and MOS transistor M3 turning on are removed.

In the present example, since the current sense signal, such as the current sense signal IC1, from a first buck converter circuit, such as channel 110, is blanked for a period of time that is defined by the actions of the MOS transistors, such as the MOS transistors M3 and M4, in a second buck converter circuit, such as channel 120, the current sense signal in the first buck converter circuit is said to be cross channel blanked.

At time T9, controller 130 outputs the rising edge of the second IC1 cross blanking pulse CB2. At time T10, the gate signal G3 falls and turns off MOS transistor M3. At time T11, controller 130 outputs the rising edge of the gate signal G4, which turns on MOS transistor M4. The difference in time between time T10 and time T11 is a dead time TD3, which is less than the G3 pulse width (T10–T7) and on the order of a few nanoseconds. The dead time TD3 ensures that MOS transistor M3 is fully off before MOS transistor M4 turns on, which prevents shoot-through from occurring where current flows through MOS transistor M3 and MOS transistor M4 directly to ground.

When MOS transistor M3 turns off, a current no longer flows through MOS transistor M3 to inductor L2. However, a current continues to flow through inductor L2, circulating from ground and the body-to-drain diode of MOS transistor M4, because the current in an inductor cannot change instantaneously. After MOS transistor M4 turns on, the current flows from the ground-connected source to the drain of MOS transistor M4 through inductor L2 to capacitor C1.

Current sense circuit 122 senses the magnitude of the current that flows through MOS transistor M4. Due to circuit parasitics (both substrate level and board level, such as package lead inductances), high current gate drive pulses, and other factors, a noise spike can be generated on the leading edge of the current sense signal IC2 when MOS transistor M4 turns on.

In addition to the gate signal G4, controller 130 also outputs the rising edge of the leading-edge blanking pulse LE2 at time T11. Blanking circuit 124 receives the current sense signal IC2 and the leading-edge blanking pulse LE2, blanks the current sense signal IC2 for the IC2 edge blanking period of time in response to the rising edge of the leading-edge blanking pulse LE2, and outputs the blanked sense signal IB2 in response.

At time T12, the leading-edge blanking signal LE2 falls. In the present example, blanking circuit 124 uses the rising and falling edges of the leading-edge blanking signal LE2 to define the IC2 edge blanking period of time. The blanked sense signal IB2 is identical to the current sense signal IC2 when MOS transistor M4 is on, except that the blanked sense signal IB2 is held at a low voltage level, such as ground, during the blanking periods of time, such as the IC2 edge blanking period of time. The duration of the IC2 edge blanking period of time corresponds with the width of the noise spike on the leading edge of the current sense signal IC2. Thus, by holding the current sense signal IC2 at a low voltage level during the IC2 edge blanking period of time, the effects of any noise spike on the leading edge of the current sense signal IC2 are removed.

At time T13, controller 130 outputs the falling edge of the IC1 cross blanking pulse CB2. The blanked sense signal IB1 is identical to the current sense signal IC1 when MOS transistor M2 is on, except that the blanked sense signal IB1 is held at a low voltage level, such as ground, during the blanking periods of time, such as the second IC1 cross blanking period of time.

Due to the coupling of circuit parasitics within an integrated circuit, noise spikes can be generated on the current sense signal IC1 when MOS transistor M3 turns off and MOS transistor M4 turns on. The duration of the second IC1 cross blanking period of time corresponds with the width of the noise spikes on the current sense signal IC1 that can result from MOS transistor M4 turning on and MOS transistor M3 turning off. Thus, by holding the current sense signal IC1 at a low voltage level during the second IC1 cross blanking period of time, the effects of any cross-coupled noise spike on the current sense signal IC1 that result from MOS transistor M3 turning off and MOS transistor M4 turning on are removed.

The first and second cross blanking periods of time are longer than the edge blanking period of time because the cross blanking periods of time must account for the change of state of two MOS transistors as well as a short dead time in between. However, the edge blanking period of time can optionally be extended to be equal to the cross blanking periods of time.

At time T14, controller 130 outputs the rising edge of the IC2 cross blanking pulse CB3. At time T15, the gate signal G2 falls and turns off MOS transistor M2. At time T16, controller 130 outputs the rising edge of the gate signal G1, which turns on MOS transistor M1. The difference in time between time T15 and time T16 is a dead time TD4, which is less than the G1 pulse width (T19−T16) and on the order of a few nanoseconds. The dead time TD4 ensures that MOS transistor M2 is fully off before MOS transistor M1 turns on, which prevents shoot-through from occurring where current flows through MOS transistor M1 and MOS transistor M2 directly to ground.

When MOS transistor M1 turns on, a current again flows through MOS transistor M1 and inductor L1 to capacitor C1. The current that flows through inductor L1 creates and temporarily stores energy in a magnetic field around inductor L1, while the current that flows to capacitor C1 charges up the voltage on capacitor C1.

At time T17, controller 130 outputs the falling edge of the IC2 cross blanking pulse CB3. The blanked sense signal IB2 is identical to the current sense signal IC2 when MOS transistor M4 is on, except that the blanked sense signal IB2 is held at a low voltage level, such as ground, during the blanking periods of time, such as the first IC2 cross blanking period of time.

Due to the coupling of circuit parasitics within an integrated circuit, a noise spike can be generated on the current sense signal IC2 when MOS transistor M2 turns off, and a significant noise spike can be generated on the current sense signal IC2 when MOS transistor M1 turns on. The duration of the first IC2 cross blanking period of time corresponds with the width of the noise spikes on the current sense signal IC2 that can result from MOS transistor M2 turning off and MOS transistor M1 turning on. Thus, by holding the current sense signal IC2 at a low voltage level during the first IC2 cross blanking period of time, the effects of any cross-coupled noise spike on the current sense signal IC2 that result from MOS transistor M2 turning off and MOS transistor M1 turning on are removed.

At time T18, controller 130 outputs the rising edge of the IC2 cross blanking pulse CB4. At time T19, the gate signal G1 falls and turns off MOS transistor M1. At time T20, controller 130 outputs the rising edge of the gate signal G2, which turns on MOS transistor M2, and the rising edge of the next leading-edge blanking pulse LE1. At time T21, controller 130 outputs the falling edge of the leading-edge blanking pulse LE1.

When MOS transistor M1 turns off, a current no longer flows through MOS transistor M1 to inductor L1. However, a current continues to flow through inductor L1, circulating from ground and the body-to-drain diode of MOS transistor M2, because the current in an inductor cannot change instantaneously. After MOS transistor M2 turns on, the current flows from the source to the drain of MOS transistor M2 through inductor L1 to capacitor C1.

At time T22, controller 130 outputs the falling edge of the IC2 cross blanking pulse CB4. The blanked sense signal IB2 is identical to the current sense signal IC2 when MOS transistor M4 is on, except that the blanked sense signal IB2 is held at a low voltage level, such as ground, during the blanking periods of time, such as the second IC2 cross blanking period of time.

Due to the coupling of circuit parasitics within an integrated circuit, noise spikes can be generated on the current sense signal IC2 when MOS transistor M1 turns off and MOS transistor M2 turns on. The duration of the second IC2 cross blanking period of time corresponds with the width of the noise spikes on the current sense signal IC2 that can result from MOS transistor M1 turning off and MOS transistor M2 turning on. Thus, by holding the current sense signal IC2 at a low voltage level during the second IC2 cross blanking period of time, the effects of any cross-coupled noise spike on the current sense signal IC2 that result from MOS transistor M1 turning off and MOS transistor M2 turning on are removed. Operation then continues on as described above.

Although the present invention has been described with a two-phase synchronous buck converter, the present invention applies equally to multiphase synchronous buck converters that have three or more phases and a single output or multiple outputs. Thus, the present invention includes a multiphase synchronous buck converter that has a number of channels, each like channel 110 or 120, where each channel includes a first MOS transistor, like MOS transistor M1 or M3, and a second MOS transistor, like MOS transistor M2 or M4.

Each channel also includes an inductor, like inductor L1 or L2, and a current sense circuit, like current sense circuit 112 or 122, that senses a current that flows through the second MOS transistor, and outputs a current sense signal in response. Further, each channel includes a blanking circuit, like blanking circuit 114 or 124, which is connected to the current sense circuit to receive the current sense signal.

In addition, the multiphase synchronous buck converter includes a capacitor, like capacitor C1, and a controller, like controller 130, that are connected to each of the channels. The controller selects one of the channels as a selected channel to charge the capacitor and generates a first gate signal, a second gate signal, and a first cross blanking pulse.

The second gate signal is output to the second MOS transistor in the selected channel to turn off the second MOS transistor in the selected channel. After this, the first gate signal is output to the first MOS transistor in the selected channel to turn on the first MOS transistor in the selected channel. The first cross blanking pulse is output to the blanking circuit in each non-selected channel. Each blanking circuit in a non-selected channel blanks the current sense signal in the non-selected channel in response to the first cross blanking pulse for a first cross blanking period of time that begins before the second MOS transistor in the selected channel turns off and ends after the first MOS transistor in the selected channel turns on.

In addition, as described above, the controller outputs the first gate signal to the first MOS transistor in the selected channel to turn off the first MOS transistor in the selected channel. After this, the controller outputs the second gate signal to the second MOS transistor in the selected channel to turn on the second MOS transistor in the selected channel. The controller outputs a second cross blanking pulse to the blanking circuit in each non-selected channel. Each current sense signal in a non-selected channel is blanked by its blanking circuit in response to the second cross blanking pulse for a second cross blanking period of time that begins before the first MOS transistor in the selected channel turns off and ends after the second MOS transistor in the selected channel turns on. After the capacitor has been charged up by one channel, the controller selects another one of the channels as the selected channel to charge the capacitor, and continues until each of the channels has been selected to charge the capacitor.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A power converter comprising:
   a first MOS transistor;
   a second MOS transistor connected to the first MOS transistor;
   a third MOS transistor;
   a fourth MOS transistor connected to the third MOS transistor;
   a first current sense circuit connected to the second MOS transistor, the first current sense circuit to sense a current that flows through the second MOS transistor, and output a first current sense signal in response;
   a first blanking circuit connected to the first current sense circuit, the first blanking circuit to blank the first current sense signal for a first cross blanking period of time in response to a first cross blanking pulse of a plurality of first blanking pulses, the first cross blanking period of time to begin before the fourth MOS transistor turns off and end after the third MOS transistor turns on;
   a controller connected to the first, second, third, and fourth MOS transistors and the first blanking circuit, the controller to output the plurality of first blanking pulses.

2. The power converter of claim 1 wherein the first blanking circuit blanks the first current sense signal for a second cross blanking period of time in response to a second cross blanking pulse of the plurality of first blanking pulses, the second cross blanking period of time to begin before the third MOS transistor turns off, and end after the fourth MOS transistor turns on.

3. The power converter of claim 2 wherein the first cross blanking period of time and the second cross blanking period of time are substantially identical.

4. The power converter of claim 2 wherein the third MOS transistor turns on after the fourth MOS transistor turns off, and the fourth MOS transistor turns on after the third MOS transistor turns off.

5. The power converter of claim 2 and further comprising:
   a first inductor connected to the first and second MOS transistors;
   a second inductor connected to the third and fourth MOS transistors; and
   a capacitor connected to the first and second inductors.

6. The power converter of claim 2 wherein the first blanking circuit blanks the first current sense signal for a first edge blanking period of time in response to a first edge blanking pulse of the plurality of first blanking pulses, the first edge blanking period of time to begin when the second MOS transistor turns on.

7. The power converter of claim 6 wherein the first cross blanking period of time is greater than the first edge blanking period of time.

8. The power converter of claim 2 and further comprising:
   a second current sense circuit connected to the fourth MOS transistor, the second current sense circuit to sense a current that flows through the fourth MOS transistor, and output a second current sense signal in response; and
   a second blanking circuit connected to the second current sense circuit, the second blanking circuit to blank the second current sense signal for a third cross blanking period of time in response to a third cross blanking pulse of a plurality of second blanking pulses output by the controller, the third cross blanking period of time to begin before the second MOS transistor turns off and end after the first MOS transistor turns on.

9. The power converter of claim 8 wherein the second blanking circuit blanks the second current sense signal for a fourth cross blanking period of time in response to a fourth cross blanking pulse of the plurality of second blanking pulses, the fourth cross blanking period of time to begin before the first MOS transistor turns off, and end after the second MOS transistor turns on.

10. The power converter of claim 9 wherein the second blanking circuit blanks the second current sense signal for a second edge blanking period of time in response to a second edge blanking pulse of the plurality of second blanking pulses, the second edge blanking period of time to begin when the fourth MOS transistor turns on.

11. A power converter comprising:
a plurality of channels, each channel having:
a first MOS transistor;
a second MOS transistor connected to the first MOS transistor;
an inductor connected to the first and second MOS transistors;
a current sense circuit connected to the second MOS transistor, the current sense circuit to sense a current that flows through the second MOS transistor, and output a current sense signal in response; and
a blanking circuit connected to the current sense circuit, the blanking circuit to receive the current sense signal; and
a controller connected to each channel, the controller to select a channel from the plurality of channels as a selected channel and output:
a gate signal to the second MOS transistor in the selected channel to turn off the second MOS transistor in the selected channel;
a gate signal to the first MOS transistor in the selected channel to turn on the first MOS transistor in the selected channel; and
a first cross blanking pulse to the blanking circuit in each non-selected channel of the plurality of channels, each blanking circuit in a non-selected channel to blank the current sense signal in the non-selected channel in response to the first cross blanking pulse for a first cross blanking period of time that begins before the second MOS transistor in the selected channel turns off and ends after the first MOS transistor in the selected channel turns on.

12. The power converter of claim 11 wherein the controller outputs a second cross blanking pulse to the blanking circuit in each non-selected channel of the plurality of channels, each current sense signal in a non-selected channel to be blanked in response to the second cross blanking pulse for a second cross blanking period of time that begins before the first MOS transistor in the selected channel turns off and ends after the second MOS transistor in the selected channel turns on.

13. A method of operating a power converter, the method comprising:

turning off a first MOS transistor, and turning on a second MOS transistor, the second MOS transistor being connected to the first MOS transistor;
sensing a current that flows through the second MOS transistor when the second MOS transistor is turned on, and outputting a first current sense signal in response;
turning on a third MOS transistor after a fourth MOS transistor has turned off, the fourth MOS transistor being connected to the third MOS transistor; and
blanking the first current sense signal for a first cross blanking period of time, the first cross blanking period of time to begin before the fourth MOS transistor turns off and end after the third MOS transistor turns on.

14. The method of claim 13 and further comprising blanking the first current sense signal for a second cross blanking period of time, the second cross blanking period of time to begin before the third MOS transistor turns off and end after the fourth MOS transistor turns on.

15. The method of claim 14 wherein the first cross blanking period of time and the second cross blanking period of time are substantially identical.

16. The method of claim 14 and further comprising blanking the first current sense signal for a first edge blanking period of time, the first edge blanking period of time to begin when the second MOS transistor turns on.

17. The method of claim 16 wherein the first cross blanking period of time is greater than the first edge blanking period of time.

18. The method of claim 14 and further comprising:
sensing a current that flows through the fourth MOS transistor when the fourth MOS transistor is turned on, and outputting a second current sense signal in response; and
blanking the second current sense signal for a third cross blanking period of time, the third cross blanking period of time to begin before the second MOS transistor turns off and end after the first MOS transistor turns on.

19. The method of claim 18 and further comprising blanking the second current sense signal for a fourth cross blanking period of time, the fourth cross blanking period of time to begin before the first MOS transistor turns off and end after the second MOS transistor turns on.

20. The method of claim 19 and further comprising blanking the second current sense signal for a second edge blanking period of time, the second edge blanking period of time to begin when the fourth MOS transistor turns on.

* * * * *